United States Patent
Casley et al.

(10) Patent No.: US 12,479,104 B2
(45) Date of Patent: Nov. 25, 2025

(54) SYSTEM AND METHOD FOR ALIGNING A SURGICAL ROBOTIC ARM

(71) Applicant: Covidien LP, Mansfield, MA (US)

(72) Inventors: Sean Casley, Branford, CT (US);
Renen Bassik, Lexington, MA (US);
Gregory Lanier, Merrimack, NH (US);
Jason Iceman, Cheshire, CT (US)

(73) Assignee: Covidien LP, Mansfield, MA (US)

( * ) Notice: Subject to any disclaimer, the term of this patent is extended or adjusted under 35 U.S.C. 154(b) by 322 days.

(21) Appl. No.: 17/603,715

(22) PCT Filed: Jun. 12, 2019

(86) PCT No.: PCT/US2019/036657
§ 371 (c)(1),
(2) Date: Oct. 14, 2021

(87) PCT Pub. No.: WO2020/214193
PCT Pub. Date: Oct. 22, 2020

(65) Prior Publication Data
US 2022/0193913 A1    Jun. 23, 2022

Related U.S. Application Data

(60) Provisional application No. 62/833,876, filed on Apr. 15, 2019.

(51) Int. Cl.
*B25J 9/16* (2006.01)
*A61B 34/30* (2016.01)
(Continued)

(52) U.S. Cl.
CPC ............. *B25J 9/1692* (2013.01); *A61B 34/30* (2016.02); *A61B 90/06* (2016.02); *A61B 90/92* (2016.02);
(Continued)

(58) Field of Classification Search
CPC ........ B25J 9/1692; A61B 34/30; A61B 90/06; A61B 90/92; A61B 2017/00725;
(Continued)

(56) References Cited

U.S. PATENT DOCUMENTS

| | | | | |
|---|---|---|---|---|
| 2008/0249394 A1* | 10/2008 | Giori | ................. | A61B 5/4528 600/407 |
| 2011/0174997 A1* | 7/2011 | Rees | ................. | A61B 6/4423 250/516.1 |

(Continued)

FOREIGN PATENT DOCUMENTS

| | | | |
|---|---|---|---|
| CN | 205085982 U | * | 3/2016 |
| CN | 106456263 A | | 2/2017 |

(Continued)

OTHER PUBLICATIONS

English Translation for CN205085982 (Year: 2016).*

(Continued)

*Primary Examiner* — Hongye Liang
(74) *Attorney, Agent, or Firm* — Carter, DeLuca & Farrel

(57) ABSTRACT

A medical system includes a robotic arm, a surgical cart, a setup arm, and an alignment unit. The setup arm is mounted to the surgical cart and is configured to operatively couple to the robotic arm. The alignment unit is operatively coupled to the setup arm and configured to determine the orientation of the robotic arm relative to a representative coordinate system. A method of aligning a robotic arm with a representative coordinate system includes projecting an alignment pattern from an alignment unit onto a horizontal surface such as the floor, patient, or representative coordinate system, wherein the alignment unit is operatively coupled to a setup arm mounted to a surgical cart. A user is then prompted to manipulate the alignment pattern by adjusting the alignment unit. An input indicating that adjustments to the alignment unit are complete is then received. The method (Continued)

further includes determining an orientation of the alignment pattern relative to representative coordinate system a representative coordinate system, and determining an orientation of a robotic arm, operatively coupled to the setup arm, based on the determined orientation of the alignment pattern.

19 Claims, 7 Drawing Sheets

(51) Int. Cl.
  *A61B 90/00* (2016.01)
  *A61B 90/92* (2016.01)
  *A61B 17/00* (2006.01)
  *A61B 34/20* (2016.01)

(52) U.S. Cl.
  CPC .............. *A61B 2017/00725* (2013.01); *A61B 2034/2059* (2016.02); *A61B 2090/067* (2016.02); *A61B 2090/0811* (2016.02)

(58) Field of Classification Search
  CPC ...... A61B 2034/2059; A61B 2090/067; A61B 2090/0811
  See application file for complete search history.

(56) References Cited

U.S. PATENT DOCUMENTS

| | | | | |
|---|---|---|---|---|
| 2013/0218024 | A1* | 8/2013 | Boctor | A61B 8/4416 600/476 |
| 2016/0166333 | A1* | 6/2016 | Wang | A61B 34/10 600/476 |
| 2017/0007335 | A1 | 1/2017 | Popovic et al. | |
| 2018/0344420 | A1 | 12/2018 | Wiggers | |
| 2018/0370036 | A1 | 12/2018 | Scholan | |
| 2019/0231460 | A1* | 8/2019 | DiMaio | A61B 50/33 |

FOREIGN PATENT DOCUMENTS

| | | |
|---|---|---|
| CN | 108408395 * | 8/2018 |
| CN | 109310474 A | 2/2019 |
| WO | 2017055955 A1 | 4/2017 |
| WO | 2018052796 A1 | 3/2018 |
| WO | 2018157078 A1 | 8/2018 |
| WO | 2018222470 A1 | 12/2018 |

OTHER PUBLICATIONS

Extended European Search Report issued in corresponding application EP 19925367.5 dated Dec. 9, 2022 (8 pages).

Office Action issued in corresponding Japanese Application 2021-558801 mailed May 29, 2023, together with English language translation (14 pages).

International Search Report and Written Opinion dated Jan. 10, 2020 issued in corresponding PCT Appln. No. PCT/US2019/036657.

Japanese Office Action for Japanese Patent Application No. 2021-558801 dated May 29, 2023 (14 pages).

Office Action issued in corresponding Canadian Application No. 3,134,263 dated Feb. 27, 2024 (3 pages).

Office Action issued in corresponding Chinese Application No. 201980001031 dated Apr. 12, 2024, together with English language translation (16 pages).

* cited by examiner

500

Start
↓
502 Prompt a user to adjust the setup arm relative to the surgical table
↓
504 Project an alignment pattern from the laser alignment unit onto the surgical table
↓
506 Prompt the user to manipulate the alignment pattern by adjusting the laser alignment unit
↓
508 Receive an input indicating that adjustments to the setup arm and/or the laser alignment unit are complete
↓
510 Determine an orientation of the alignment pattern relative to the surgical table
↓
512 Determine an orientation of a robotic arm, operatively coupled to the setup arm, based on the determined orientation of the alignment pattern
↓
514 Correlate the orientation of the robotic arm relative to the surgical table with movements of an input device for manipulating the robotic arm
↓
End

FIG. 8

SYSTEM AND METHOD FOR ALIGNING A SURGICAL ROBOTIC ARM

CROSS-REFERENCE TO RELATED APPLICATION

This application is a National Stage Application under 35 U.S.C. § 371 (a) of PCT/US2019/36657, filed Jun. 12, 2019, which claims the benefit of and priority to U.S. Provisional Application No. 62/833,876, filed Apr. 15, 2019. The entire contents of all of the foregoing applications are incorporated by reference herein.

BACKGROUND

1. Technical Field

The present disclosure generally relates to an apparatus and method for aligning surgical robotic arms. More particularly, the present disclosure is directed to an alignment unit that is utilized to align the robotic arm within a surgical environment.

2. Background of Related Art

Robotic surgical systems are used in minimally invasive medical procedures because of their increased accuracy and expediency relative to handheld surgical instruments. In these robotic surgical systems, a robotic arm supports a surgical instrument having an end effector mounted thereto by a wrist assembly. In operation, the robotic arm is moved to a position over a patient and then guides the surgical instrument into a small incision via a surgical port or a natural orifice of a patient to position the end effector at a work site within the patient's body.

Typically, the robotic arms are disposed on a cart, which allows a clinician to move the robotic arm to different locations within the operating room relative to a surgical table. However, prior to utilizing the robotic arm, the robotic arm needs to be oriented. Accordingly, solutions are sought for overcoming the challenges involved in aligning and orienting the robotic arms.

SUMMARY

Provided in accordance with the present disclosure is a medical system including a robotic arm, a surgical cart, a setup arm, and an alignment unit. The setup arm is mounted to the surgical cart and configured to operatively couple to the robotic arm. The alignment unit is operatively coupled to the setup arm and is configured to determine an orientation of the robotic arm relative to a representative coordinate system overlaid over any substantially horizontal surface (e.g., floor). As used herein "a representative coordinate system" denotes any two or three dimensional coordinate system that overlays a surgical area where one or more robotic arms are used. The coordinate system may be Cartesian, polar, cylindrical, spherical, and the like.

According to aspects of the disclosure, the alignment unit includes a light unit configured to project an alignment pattern onto a horizontal surface. The light unit may be configured to project at least two lines, each being visually different from one another, e.g., two different colors, to indicate an alignment direction.

According to further aspects of the disclosure, the alignment unit may be configured to rotate such that a rotation of the alignment unit rotates the alignment pattern. The alignment unit may be manually rotatable, and the alignment pattern may be one or more lines. The alignment unit may also include a sensor configured to determine an angle of the alignment pattern relative to the robotic arm.

According to aspects of the disclosure, the system may further include a control device operatively coupled to the setup arm, which may be configured to receive alignment information from the sensor. The alignment unit may further include an input device operatively coupled to the control device such that activation of the input device indicates that adjustment of the setup arm is complete.

According to further aspects of the disclosure, a method of aligning a robotic arm with a representative coordinate system is also disclosed. The method includes projecting an alignment pattern from an alignment unit, operatively coupled to a setup arm mounted to a surgical cart, onto a substantially horizontal surface having a representative coordinate system. The method further includes prompting a user to manipulate the alignment pattern by adjusting the alignment unit, receiving an input indicating that adjustment to the alignment unit is complete, determining an orientation of the alignment pattern relative to the representative coordinate system, and determining an orientation of a robotic arm, operatively coupled to the setup arm, based on the determined orientation of the alignment pattern.

According to aspects of the disclosure, the projected alignment pattern may indicate an alignment direction and may include at least two lines of different colors. One the lines may be red and another may be green. Manipulating the alignment pattern may also include rotating the alignment unit. According to aspects of the disclosure, determination of the orientation of the alignment pattern may be done by using a sensor disposed in the alignment unit. The method may further include activating an input device disposed on the alignment unit to indicate that adjustment to the alignment unit is complete.

BRIEF DESCRIPTION OF THE DRAWINGS

Various embodiments of the present disclosure are described herein with reference to the drawings wherein:

FIG. 8 is a flow chart illustrating a method according to the present disclosure.

DETAILED DESCRIPTION

Figure 1:
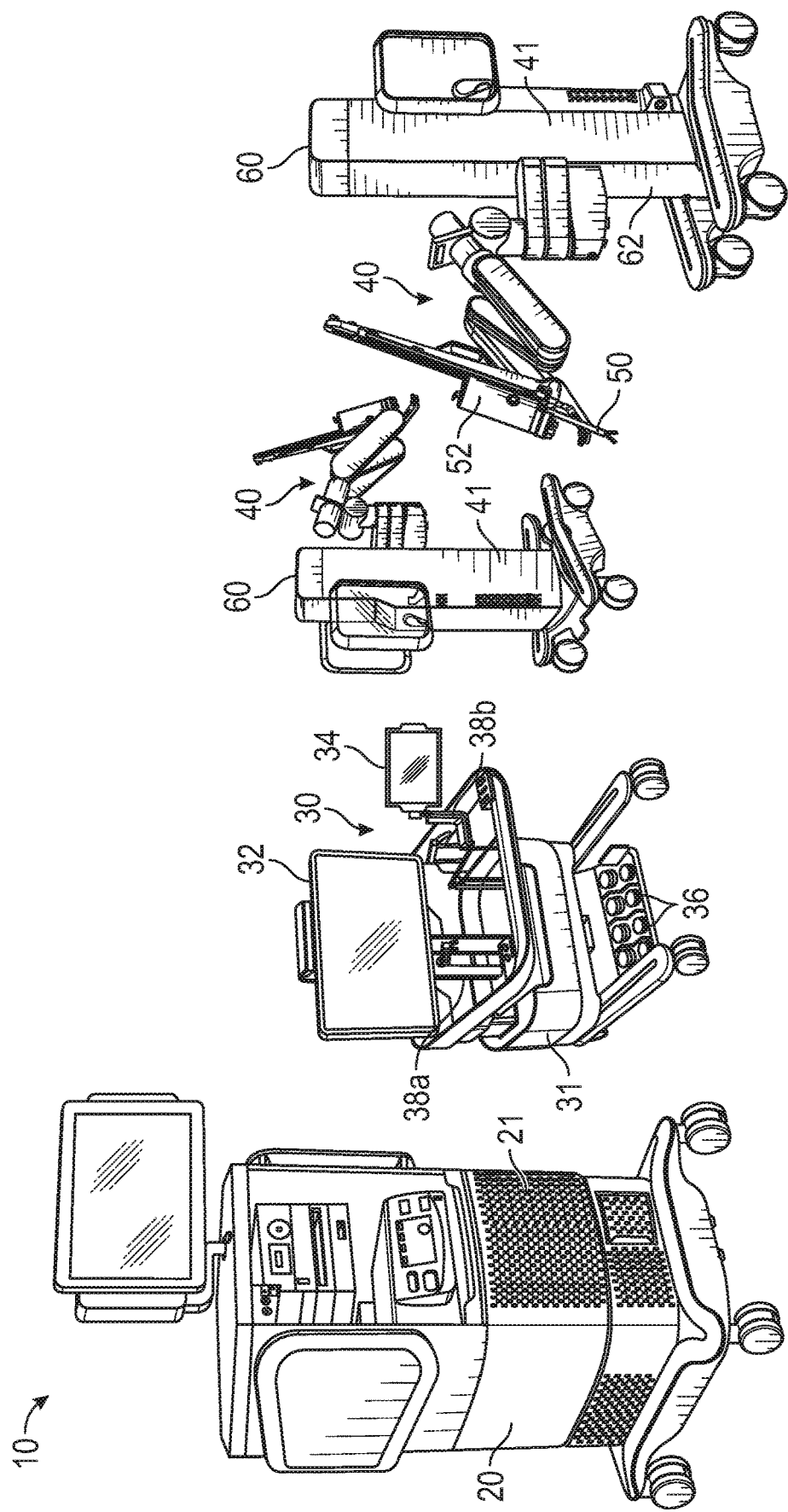
FIG. 1 is a schematic illustration of a surgical robotic system including a control tower, a console, and one or more surgical robotic arms according to the present disclosure.

Embodiments of the presently disclosed surgical robotic systems are described in detail with reference to the drawings, in which like reference numerals designate identical or corresponding elements in each of the several views. As used herein the term "distal" refers to the portion of the surgical robotic system and/or the surgical instrument coupled thereto that is closer to the patient, while the term "proximal" refers to the portion that is farther from the patient.

Although the following description is specific to a surgical robotic system, the alignment unit described below may be used with any suitable medical device requiring an alignment relative to a representative coordinate system or another orientation point. With reference to FIG. 1, a surgical robotic system 10 includes a control tower 20, which is connected to all of the components of the surgical robotic system 10 including a surgical console 30 and one or more robotic arms 40. Each of the robotic arms 40 includes a surgical instrument 50 removably coupled thereto. One or more of the robotic arms 40 may include an endoscope or a camera for observing the surgical site. The surgical instrument 50 is configured for use during minimally invasive surgical procedures. In embodiments, the surgical instrument 50 may be configured for open surgical procedures. Each of the robotic arms 40 is also coupled to a movable cart 60.

The surgical console 30 includes a first display device 32, which displays a surgical site provided by cameras (not shown) disposed on the robotic arms 40, and a second display device 34, which displays a user interface for controlling the surgical robotic system 10. The surgical console 30 also includes a plurality of user interface devices, such as foot pedals 36 and a pair of handle controllers 38a and 38b which are used by a clinician to remotely control robotic arms 40.

The control tower 20 acts as an interface between the surgical console 30 and one or more robotic arms 40. In particular, the control tower 20 is configured to control the robotic arms 40, such as to move the robotic arms 40 and the corresponding surgical instruments 50, based on a set of programmable instructions and/or input commands from the surgical console 30, in such a way that robotic arms 40 and the surgical instrument 50 execute a desired movement sequence in response to input from the foot pedals 36 and the handle controllers 38a and 38b.

Each of the control tower 20, the surgical console 30, and the robotic arm 40 includes a respective computer 21, 31, 41. The computers 21, 31, 41 are interconnected to each other using any suitable communication network based on wired or wireless communication protocols. The term "network," whether plural or singular, as used herein, denotes a data network, including, but not limited to, the Internet, Intranet, a wide area network, or a local area networks, and without limitation as to the full scope of the definition of communication networks as encompassed by the present disclosure. Suitable protocols include, but are not limited to, transmission control protocol/internet protocol (TCP/IP), datagram protocol/internet protocol (UDP/IP), and/or datagram congestion control protocol (DCCP). Wireless communication may be achieved via one or more wireless configurations, e.g., radio frequency, optical, Wi-Fi, Bluetooth (an open wireless protocol for exchanging data over short distances, using short length radio waves, from fixed and mobile devices, creating personal area networks (PANs), ZigBee® (a specification for a suite of high level communication protocols using small, low-power digital radios based on the IEEE 802.15.4-2003 standard for wireless personal area networks (WPANs)).

The computers 21, 31, 41 may include any suitable processor (not shown) operably connected to a memory (not shown), which may include one or more of volatile, non-volatile, magnetic, optical, or electrical media, such as read-only memory (ROM), random access memory (RAM), electrically-erasable programmable ROM (EEPROM), non-volatile RAM (NVRAM), or flash memory. The processor may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central processing unit (CPU), a microprocessor, and combinations thereof. Those skilled in the art will appreciate that the processor may be substituted for by using any logic processor (e.g., control circuit) adapted to execute algorithms, calculations, and/or set of instructions described herein.

Figure 2:
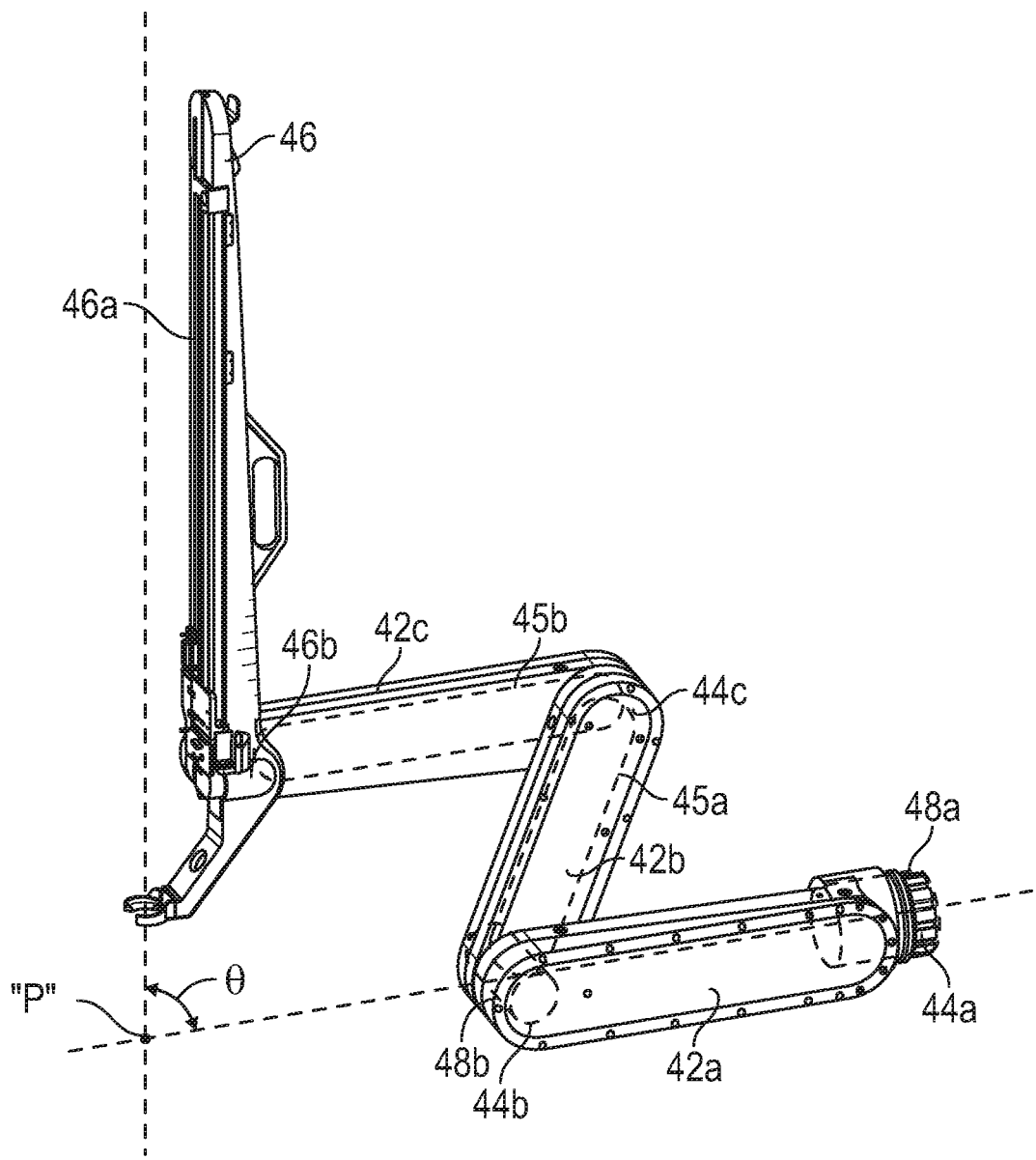
FIG. 2 is a perspective view of a surgical robotic arm of the surgical robotic system of FIG. 1 according to the present disclosure.
Figure 3:
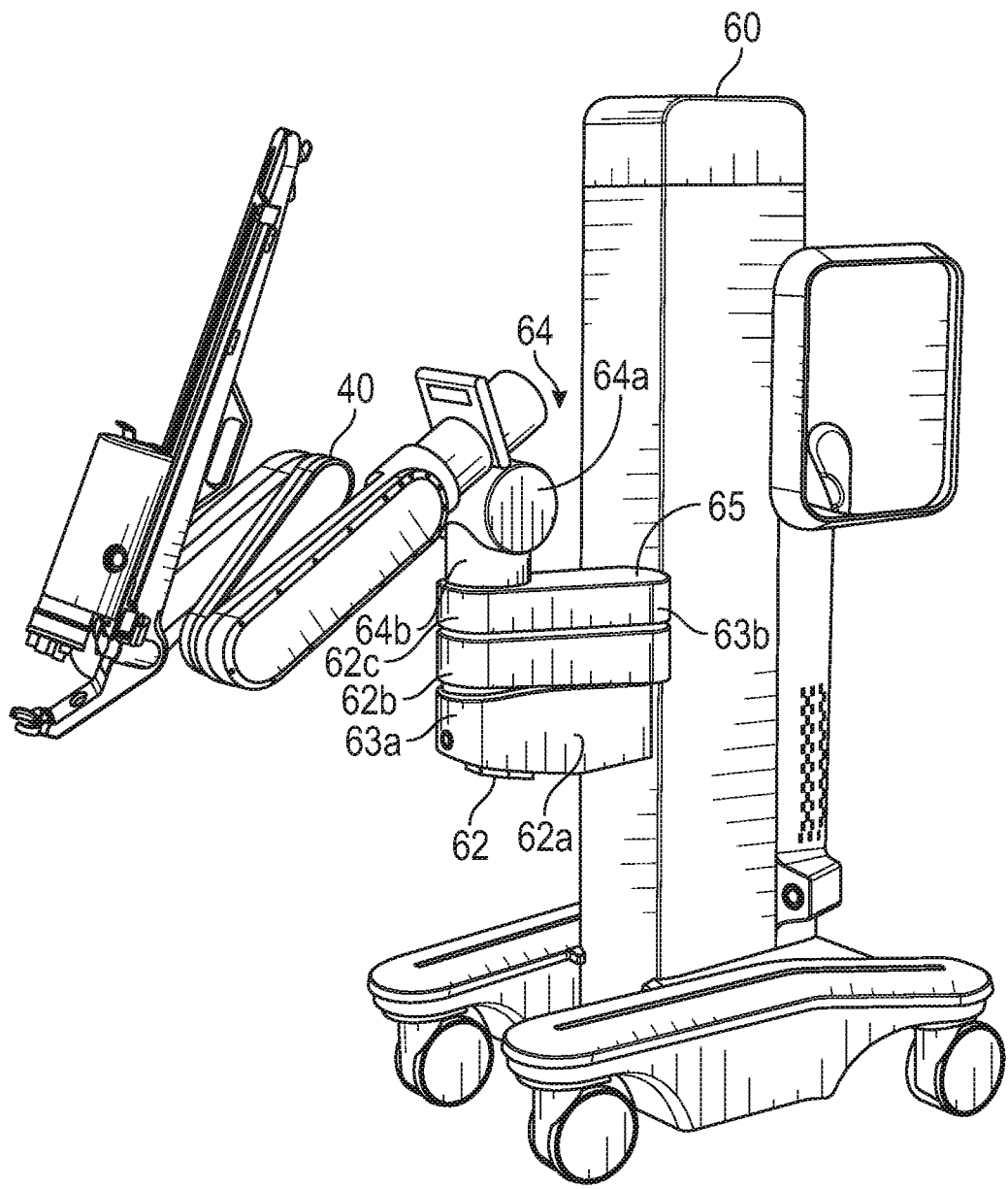
FIG. 3 is a perspective view of a setup arm with the surgical robotic arm of the surgical robotic system of FIG. 1 according to the present disclosure.

With reference to FIG. 2, each of the robotic arms 40 may include of a plurality of links 42a, 42b, 42c, which are interconnected at rotational joints 44a, 44b, 44c, respectively. The joint 44a is configured to secure the robotic arm 40 to the movable cart 60 and defines a first longitudinal axis. With reference to FIG. 3, the movable cart 60 includes a lift 61 and a setup arm 62, which provides a base for mounting of the robotic arm 40. The lift 61 allows for vertical movement of the setup arm 62. The setup arm 62 includes a first link 62a, a second link 62b, and a third link 62c, which provide for lateral maneuverability of the robotic arm 40. The links 62a, 62b, 62c are interconnected at rotational joints 63a and 63b, each of which may include an actuator (not shown) for rotating the links 62b and 62b relative to each other and the link 62c. In particular, the links 62a, 62b, 62c are movable in their corresponding lateral planes that are parallel to each other, thereby allowing for extension of the robotic arm 40 relative to the patient (e.g., surgical table). In embodiments, the robotic arm 40 may be coupled to the surgical table (not shown). The setup arm 62 includes controls 65 for adjusting movement of the links 62a, 62b, 62c as well as the lift 61.

The third link 62c includes a rotatable base 64 having two degrees of freedom. In particular, the rotatable base 64 includes a first actuator 64a and a second actuator 64b. The first actuator 64a is rotatable about a first stationary arm axis which is perpendicular to a plane defined by the third link 62c and the second actuator 64b is rotatable about a second stationary arm axis which is transverse to the first stationary arm axis. The first and second actuators 64a and 64b allow for full three-dimensional orientation of the robotic arm 40.

With reference to FIG. 2, the robotic arm 40 also includes a holder 46 defining a second longitudinal axis and configured to receive an instrument drive unit 52 (FIG. 1) of the surgical instrument 50, which is configured to couple to an actuation mechanism of the surgical instrument 50. Instrument drive unit 52 transfers actuation forces from its actuators to the surgical instrument 50 to actuate components (e.g., end effectors) of the surgical instrument 50. The holder 46 includes a sliding mechanism 46a, which is configured to move the instrument drive unit 52 along the second longitudinal axis defined by the holder 46. The holder 46 also includes a rotational joint 46b, which rotates the holder 46 relative to the link 42c.

The joints 44a and 44b include an electrical actuator 48a and 48b configured to drive the joints 44a, 44b, 44c relative to each other through a series of belts 45a and 45b or other mechanical linkages such as a drive rod, a cable, or a lever and the like. In particular, the actuator 48b of the joint 44b is coupled to the joint 44c via the belt 45a, and the joint 44c is in turn coupled to the joint 46c via the belt 45b. Joint 44c may include a transfer case coupling the belts 45a and 45b, such that the actuator 48b is configured to rotate each of the links 42b, 42c and the holder 46 relative to each other. More specifically, links 42b, 42c, and the holder 46 are passively coupled to the actuator 48b which enforces rotation about a pivot point "P" which lies at an intersection of the first axis defined by the link 42a and the second axis defined by the holder 46. Thus, the actuator 48b controls the angle θ between the first and second axes allowing for orientation of the surgical instrument 50. Due to the interlinking of the links 42a, 42b, 42c, and the holder 46 via the belts 45a and 45b, the angles between the links 42a, 42b, 42c, and the holder 46 are also adjusted in order to achieve the desired angle θ. In embodiments, some or all of the joints 44a, 44b, 44c may include an electrical actuator to obviate the need for mechanical linkages.

Figure 4:
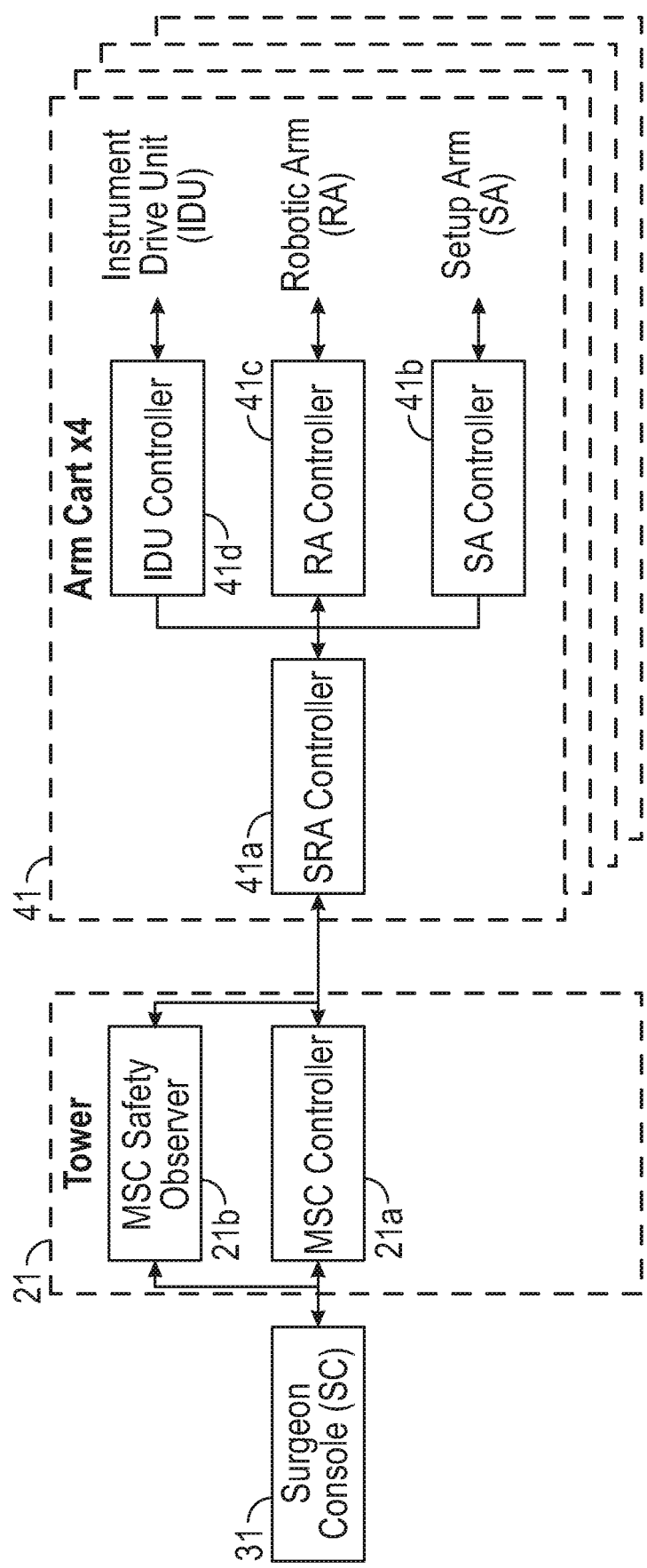
FIG. 4 is a schematic diagram of a computer architecture of the surgical robotic system of FIG. 1 according to the present disclosure.

With reference to FIG. 4, each of the computers 21, 31, 41 of the surgical robotic system 10 may include a plurality of controllers, which may be embodied in hardware and/or software. The computer 21 of the control tower 20 includes a controller 21a and safety observer 21b. The controller 21a receives data from the computer 31 of the surgical console 30 about the current position and/or orientation of the handle controllers 38a and 38b and the state of the foot pedals 36 and other buttons. The controller 21a processes these input positions to determine desired drive commands for each joint of the robotic arm 40 and/or the instrument drive unit 52 and communicates these to the computer 41 of the robotic arm 40. The controller 21a also receives back the actual joint angles and uses this information to determine force feedback commands that are transmitted back to the computer 31 of the surgical console 30 to provide haptic feedback through the handle controllers 38a and 38b. The safety observer 21b performs validity checks on the data going into and out of the controller 21a and notifies a system fault handler if errors in the data transmission are detected to place the computer 21 and/or the surgical robotic system 10 into a safe state.

The computer 41 includes a plurality of controllers, namely, a main controller 41a, a setup arm controller 41b, a robotic arm controller 41c, and an instrument drive unit (IDU) controller 41d. The main cart controller 41a receives and processes joint commands from the controller 21a of the computer 21 and communicates them to the setup arm controller 41b, the robotic arm controller 41c, and the IDU controller 41d. The main cart controller 41a also manages instrument exchanges and the overall state of the movable cart 60, the robotic arm 40, and the instrument drive unit 52. The main cart controller 41a also communicates actual joint angles back to the controller 21a.

The setup arm controller 41b controls each of rotational joints 63a and 63b, and the rotatable base 64 of the setup arm 62 and calculates desired motor movement commands (e.g., motor torque) for the pitch axis and controls the brakes. The robotic arm controller 41c controls each joint 44a and 44b of the robotic arm 40 and calculates desired motor torques required for gravity compensation, friction compensation, and closed loop position control. The robotic arm controller 41c calculates a movement command based on the calculated torque. The calculated motor commands are then communicated to one or more of the electrical actuators 48a and 48b in the robotic arm 40. The actual joint positions are then transmitted by the electrical actuators 48a and 48b back to the robotic arm controller 41c.

The IDU controller 41d receives desired joint angles for the surgical instrument 50, such as wrist and jaw angles, and computes desired currents for the motors in the instrument drive unit 52. The IDU controller 41d calculates actual angles based on the motor positions and transmits these back to the main controller 41a.

The robotic arm controller 41c is configured to estimate torque imparted on the rotational joints 44a and 44b by the rigid link structure of the robotic arm 40, namely, the links 42a, 42b, 42c. Each of the rotational joints 44a and 44b houses electrical actuator 48a and 48b. High torque may be used to move the robotic arm 40 due to the heavy weight of the robotic arm 40. However, the torque may need to be adjusted to prevent damage or injury. This is particularly useful for limiting torque during collisions of the robotic arm 40 with external objects, such as other robotic arms, patient, staff, operating room equipment, etc.

Figure 5:
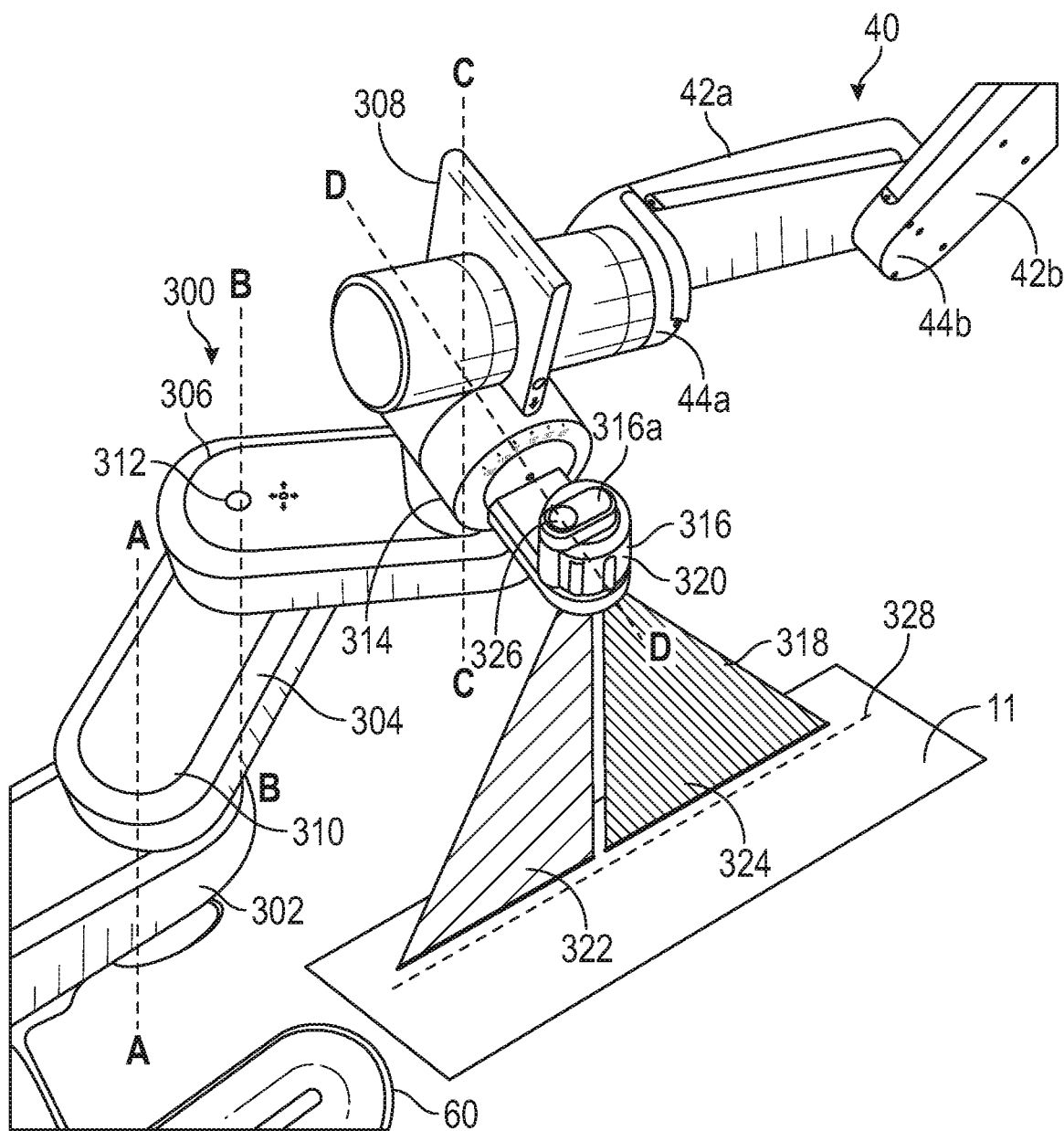
FIG. 5 is a perspective view of the setup arm and the robotic arm of the surgical robotic system of FIG. 1 according to the present disclosure.

With reference to FIG. 5, the robotic arm 40 is coupled to a setup arm 300, which is substantially the same as the setup arm 62. The setup arm 300 is further mounted to the movable cart 60. The setup arm 300 includes a setup arm base 302 that is coupled to the movable cart 60. The setup arm 300 further includes a plurality of movable links that are coupled to each other by actuators (not shown) allowing for movement of the setup arm 300 into various configurations. In particular, setup arm 300 includes a first setup link 304, a second setup link 306, and a coupling assembly 308. The coupling assembly 308 is configured to couple to a robotic arm 40.

The setup arm base 302 is configured to secure the setup arm 300 to a surgical table (not shown) or the movable cart 12. The first setup link 304 is rotatable at a joint 310 360° about an axis "A-A" relative to the setup arm base 302. The second setup link 306 is rotatable at a joint 312 about an axis "B-B" relative to the first setup link 304. The coupling assembly 308 is rotatable at a joint 314 about an axis "C-C" relative to the second setup link 306. The coupling assembly 308 is further rotatable about an axis "D-D" from about 0° to about 90°.

The setup arm 300 includes an alignment unit 316 coupled to the setup arm 300, and in particular to the joint 314. The alignment unit 316 is in operable communication with the control tower 20. In embodiments, the alignment unit 316 may be coupled directly to the coupling assembly 308. The alignment unit 316 is configured to determine the orientation of the setup arm 300 and the robotic arm 40 relative to a representative coordinate system 11, which is a construct generated by the computer 21 and is used to virtually place and orient each of the robotic arms 40 to the clinician viewpoint, e.g., through a camera and/or an endoscope. In particular, the alignment unit 316 is used to create a common reference alignment for the robotic arm 40 and to determine the yaw orientation of the robotic arm 40 relative to the representative coordinate system 11. As used herein the term "yaw" denotes movement of the robotic arm 40 about a vertical axis perpendicular to the ground.

The orientation of each link of the robotic arm 40 and each setup link of the setup arm 300 is used in calculations to make the movement of the robotic arm 40 align with movements of input devices, e.g. manual inputs 18, at the surgical console 30. The alignment unit 316 includes a light unit 412 (see FIG. 6) configured to project an alignment pattern 318 onto a horizontal surface. The alignment pattern 318 may be projected onto any surface, such as a surgical table, a floor, patient, or any other surface. The surface may not be completely horizontal as long as the alignment pattern 318 projected onto the surface is visible and discernable by a clinician or a computing device. Accordingly, any non-vertical surface may be used.

The alignment unit 316 has a rotatable body 320 that allows a user to manually rotate the alignment unit 316 and adjust the angle of the alignment pattern 318 in order to align the alignment pattern 318 with the representative coordinate system 11. In embodiments, the alignment unit 316 may include an indicator 316a, such as a printed label or image on its surface to indicate a forward direction, or a direction relative to the patient. In further embodiments, the alignment pattern 318 may be a line having an indication of a direction. In embodiments, the alignment pattern 318 may include a first portion 324 and a second portion 322. The second portion 322 of the alignment pattern 318 may indicate a forward direction, or a portion of surgical instrument 50 and the robotic arm 40 closest to the patient, and the second portion 322 may indicate a backwards direction, or a portion of surgical instrument 50 and the robotic arm 40 furthest from the patient. The second portion 322 and the first portion 324 may be visually different, such as different colors and/or patterns to allow for easier differentiation. In exemplary embodiments, the second portion 322 may be green and the first portion 324 may be red. In embodiments, the second portion 322 may be blue and the first portion 324 may be yellow to allow for better differentiating by colorblind personnel. In further embodiments, the second portion 322 and the first portion 324 may have different patterns, such as one of the first portion 324 or the second portion 322 may be solid whereas the other may be dashed.

Figure 6:
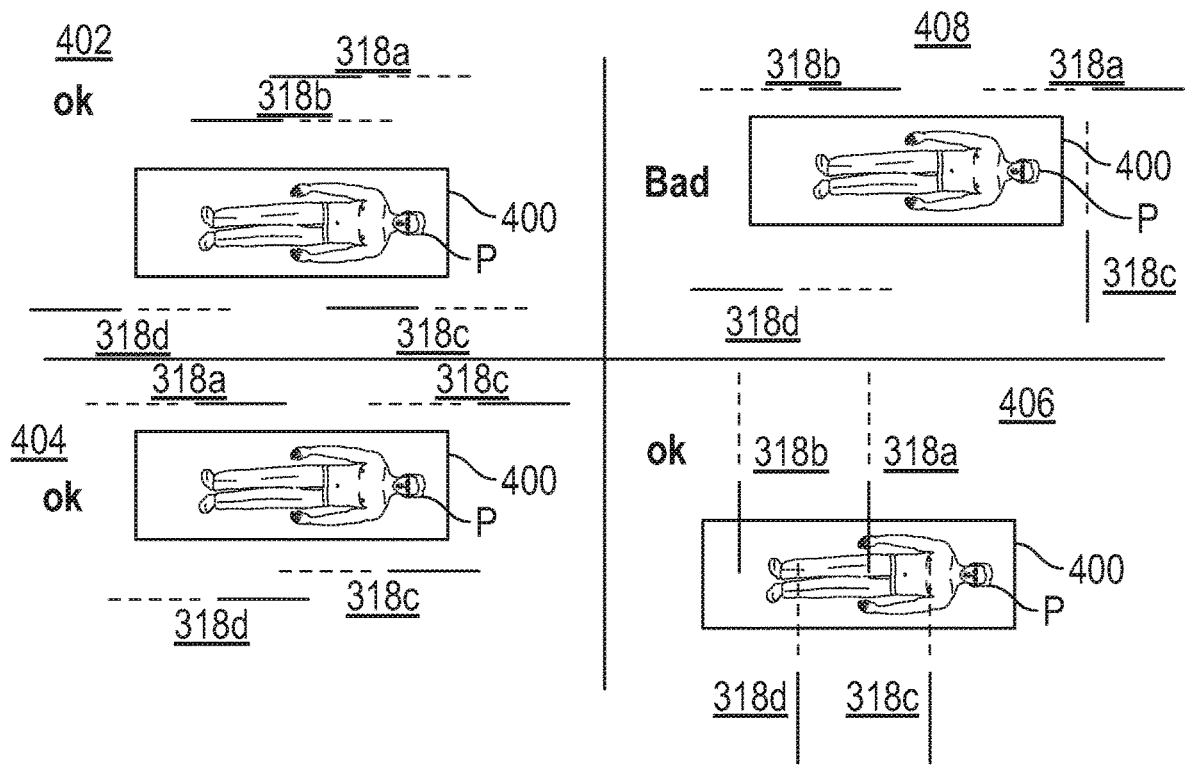
FIG. 6 is a schematic diagram of alignment patterns of the surgical robotic system of FIG. 1 according to the present disclosure.

With reference to FIG. 6, a surgical table 400 is shown with a patient "P" disposed thereon. FIG. 6 also shows a plurality of alignment patterns 318a, 318b, 318c, 318d being oriented relative to the surgical table 400. The surgical table 400 may be used as a reference point for orienting the robotic arms 40 by aligning each of their respective alignment units 316. The reference point may be any object that remains stationary during the period of alignment; such as the surgical table 400, the patient "P", a wall, a marking on the floor, or even any one of the other alignment patterns 318. The alignment patterns 318a, 318b, 318c, 318d projected by the alignment unit 316 of four robotic arms 40. The alignment pattern 318a is projected by the alignment unit 316 attached to the robotic arm 40 holding a camera and/or an endoscope. When properly oriented, the alignment patterns 318b, 318c, 318d are parallel to, and facing the same direction as the alignment pattern 318a projected from the robotic arm 40 holding the camera and/or the endoscope as shown in patterns 402, 404, and 406. Pattern 408 shows misaligned alignment patterns 318a, 318b, 318c, 318d, with the alignment pattern 318c being transverse relative to alignment patterns 318a and 318b and the alignment pattern 318d being oriented in an opposite direction than the alignment patterns 318a and 318b.

Figure 7:
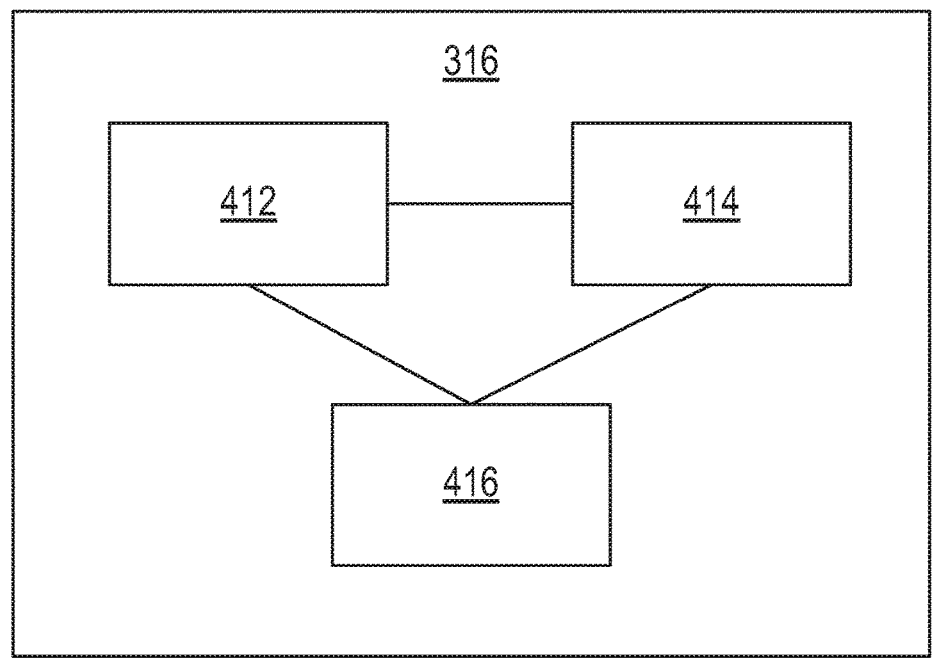
FIG. 7 is a block diagram illustrating the components of the alignment unit.

In embodiments, the alignment unit 316 includes an input device 326, which may be a button or any other user interface device, disposed on the alignment unit 316. The input device 326 is actuatable by a user to indicate to the control tower 20 and/or the surgical console 30 that adjustments to the setup arm 300 and/or the alignment unit 316 are complete. As depicted in FIG. 7, the alignment unit 316 includes a light unit 412, a sensor 414, and a connector 416. The alignment unit 316 may also include a printed circuit board for incorporating various electronic components. The sensor 414 may be any suitable encoder, potentiometer, rotary variable differential transformer, or any other kind of rotary position sensor. In embodiments, the light unit 412 projects a number of different alignment patterns 318, including various shapes, numbers, letters, and/or symbols in one or more colors to help identify an orientation and/or direction of the alignment unit 316. The light unit 412 may include a light source, such as one or more light emitting diodes, which may be configured to emit a laser, and an optional projection pattern or lens, which shapes the emitted light into the alignment pattern 318. The sensor 414 is used to determine the angle of the alignment pattern 318. The sensor 414 may be configured to measure rotation of the alignment unit 316, which is then used to determine the orientation of the robotic arm 40 relative to the representative coordinate system 11. In particular, as the alignment unit 316 is rotated by a user, the sensor 414 determines the angle of the alignment pattern 318 and correlates this angle with a position of the robotic arm 40.

Connector 416 operably couples the alignment unit 316 with the computers 21, 31, and 41 of the control tower 20, the surgical console 30, and the robotic arm 40 and allows for the transfer of data and information to and from the alignment unit 316 and the control tower 20, the surgical console 30, and the robotic arm 40. In embodiments, the connector 416 may be a wired connection (e.g. USB), or connector 416 may include a wireless transmitter/receiver in wireless communication with the control tower 20 and/or surgical console 30, which also may include a wireless transmitter/receiver. The wireless communication may be radio frequency, optical, WiFi®, Bluetooth® (an open wireless protocol for exchanging data over short distances using short length radio waves), etc. Through the connector 416, the control tower 20 and/or surgical console 30 may transfer data and/or real-time data from the alignment unit 316, and more specifically the sensor 414. The sensor 414 senses the orientation of the alignment pattern 318 and sends data regarding the angle of the alignment pattern 318 back to the control tower 20 and/or the surgical console 30. The control tower 20 or the surgical console 30 utilizes this information to correlate movement of the robotic arm 40, relative to the representative coordinate system 11, with movements of input devices, e.g. manual inputs 18, from the surgical console 30.

FIG. 8 depicts a flow chart 500 of an illustrative method for registering alignment of a robotic arm 40 with the representative coordinate system 11. In practice, when setting up the system at step 502, a user is prompted to position the movable cart 60, which includes the setup arm 300, robotic arm 40, and surgical instrument 50, adjacent to the representative coordinate system 11. The user then adjusts the setup arm 300, by manipulating the setup links 304, 306, and coupling assembly 308 to align the setup arm 300 with the representative coordinate system 11. In embodiments, the setup links 304, 306 may be manually adjustable by the user. In another embodiment, the setup links 304, 306 may include a plurality of actuators (not shown) configured to actuate the setup links 304, 306. The plurality of motors may be controlled by a control device (not shown) operable by a user. The user may be prompted to re-register the robotic arm 40 with the representative coordinate system 11, according to the disclosed method, if the robotic arm 40 is repositioned, the input device 326 is activated, or if the alignment unit 316 detects a change in yaw of the robotic arm 40. In step 504, once a user adjusts the setup arm 300 relative to the representative coordinate system 11, the alignment unit 316 is configured to project an alignment pattern 318, via the light unit, onto the representative coordinate system 11. The projected alignment pattern 318 may be of high intensity such that the alignment pattern 318 is visible to the user.

In step 506, the user is then prompted to manipulate the alignment pattern 318 by adjusting the alignment unit 316.

In particular, the user may rotate the alignment unit 316, which causes the alignment pattern 318 to rotate as well. In embodiments, the alignment pattern 318 may be a straight line. In a further embodiment, the light unit projects two or more colors of light to indicate orientation and/or direction. At step 508, once the user completes adjustments to the alignment unit 316, the user activates input device 326 disposed on the alignment unit 316 to indicate to the control tower 20 and/or the surgical console 30 that adjustments are complete and that the setup arm 300 is properly aligned to the representative coordinate system 11. At step 510, the control tower 20 and/or the surgical console 30 determines an orientation of the alignment pattern 318 relative to the representative coordinate system 11. In particular, the alignment unit 316 includes a sensor (not shown) that is used to determine an angle of the projected alignment pattern 318 relative to the position of the alignment unit 316. At step 512, based on the orientation of the alignment pattern 318 relative to the representative coordinate system 11, the control tower 20 and/or the surgical console 30 determines the position and orientation of the setup arm 300 and/or the robotic arm 40 relative to the representative coordinate system 11. At step 514, once the orientation of the robotic arm 40 is determined, the control tower 20 and/or the surgical console 30 correlates the movements and orientation of the robotic arm 40 relative to the representative coordinate system with movements of the manual inputs 18 configured to manipulate the robotic arm.

It will be understood that various modifications may be made to the embodiments disclosed herein. In embodiments, the sensors may be disposed on any suitable portion of the robotic arm. Therefore, the above description should not be construed as limiting, but merely as exemplifications of various embodiments. Those skilled in the art will envision other modifications within the scope and spirit of the claims appended thereto.

What is claimed is:

1. A surgical robotic system comprising:
    a robotic arm;
    a surgical cart;
    a setup arm mounted to the surgical cart and configured to operatively couple to the robotic arm; and
    an alignment unit operatively coupled to the setup arm via a coupling assembly, the alignment unit including a rotatable body independently rotatable relative to the setup arm and a position sensor configured to measure rotation of the rotatable body, wherein the rotatable body includes a light unit configured to project an alignment pattern onto a surface independently of an orientation of the setup arm; and
    a controller configured to determine the orientation of the setup arm and the robotic arm relative to a representative coordinate system by determining a yaw orientation of the robotic arm about a vertical axis perpendicular to the ground based on the measured rotation of the rotatable body.

2. The surgical robotic system according to claim 1, wherein the light unit is configured to project at least two portions.

3. The surgical robotic system according to claim 2, wherein each of the at least two portions is visually distinctive from each other.

4. The surgical robotic system according to claim 2, wherein each of the at least two portions is of a different color.

5. The surgical robotic system according to claim 2, wherein the at least two portions are configured to indicate an alignment direction.

6. The surgical robotic system according to claim 2, wherein each of the at least two portions includes one or more lines.

7. The surgical robotic system according to claim 1, wherein the rotatable body is configured to rotate independently relative to the setup arm such that a rotation of the alignment unit rotates the alignment pattern.

8. The surgical robotic system according to claim 1, wherein the controller is configured to determine an angle of the alignment pattern relative to the robot arm independently of the orientation of the setup arm.

9. The surgical robotic system according to claim 8, further comprising a control device operatively coupled to the setup arm and configured to receive alignment information from the sensor.

10. The surgical robotic system according to claim 9, wherein the alignment unit includes an input device operatively coupled to the control device such that activation of the input device indicates that adjustment of the setup arm is complete.

11. A method of aligning a robotic arm with a surgical table, the method comprising:
    projecting an alignment pattern from a rotatable body of an alignment unit onto a surface, the alignment unit is operatively coupled to a setup arm mounted to a surgical cart, wherein the rotatable body is independently rotatable relative to the setup arm a position sensor configured to measure rotation of the rotatable body, and the alignment pattern is projected independently of an orientation of the setup arm;
    prompting a user to manipulate the alignment pattern by adjusting the alignment unit;
    receiving an input indicating that adjustment to the alignment unit is complete;
    determining an orientation of the alignment pattern relative to a representative coordinate system;
    determining the orientation of the robotic arm, operatively coupled to the setup arm, based on the determined orientation of the alignment pattern by determining a yaw orientation of the robotic arm about a vertical axis perpendicular to the ground based on the measured rotation of the rotatable body; and
    aligning the robotic arm based upon the determination of the orientation.

12. The method according to claim 11, wherein projecting the alignment pattern includes projecting at least two portions of the alignment pattern.

13. The method according to claim 12, wherein each of the at least two portions is visually distinctive from each other.

14. The method according to claim 12, wherein each of the at least two portions is of a different color.

15. The method according to claim 12, wherein the at least two portions are configured to indicate an alignment direction.

16. The method according to claim 12, wherein each of the at least two portions includes one or more lines.

17. The method according to claim 11, wherein manipulating the alignment pattern includes rotating the rotatable body of the alignment unit.

18. The method according to claim 11, wherein determining the orientation of the alignment pattern is determined independently of the orientation of the setup arm.

19. The method according to claim 11, further comprising activating an input device disposed on the alignment unit to indicate that adjustment to the alignment unit is complete.

* * * * *